United States Patent [19]

Vivian, Jr.

[11] 4,246,804
[45] Jan. 27, 1981

[54] STEERING WHEEL WITH SPLAYED LEAVES

[75] Inventor: Lloyd R. Vivian, Jr., Birmingham, Mich.

[73] Assignee: Ford Motor Company, Dearborn, Mich.

[21] Appl. No.: 104,236

[22] Filed: Dec. 17, 1979

Related U.S. Application Data

[63] Continuation of Ser. No. 959,980, Nov. 13, 1978, abandoned.

[51] Int. Cl.³ .......................... B62D 1/04; G05G 1/10
[52] U.S. Cl. .................................. 74/552; 29/159 B; 74/558
[58] Field of Search ................. 74/552, 491, 492, 553, 74/558; 29/159 B

[56] References Cited

U.S. PATENT DOCUMENTS

| | | | |
|---|---|---|---|
| 1,854,780 | 4/1932 | Bronson | 29/159 B |
| 2,014,633 | 9/1935 | Pannecoucke | 74/552 |
| 2,041,205 | 5/1936 | Pannecoucke | 29/159 B |
| 2,041,739 | 5/1936 | Beck | 74/552 |
| 2,596,784 | 5/1952 | Nagin | 74/552 |
| 2,810,301 | 10/1957 | Mathues | 74/552 |
| 2,814,211 | 11/1957 | Hoagg | 74/552 |
| 2,889,714 | 6/1959 | Romano | 74/493 |
| 3,209,615 | 10/1965 | Fosnaugh et al. | 74/552 |
| 3,321,996 | 5/1967 | Cardinale | 74/552 |
| 3,468,188 | 9/1969 | MacCoon | 74/552 |
| 3,613,476 | 10/1971 | Cunningham | 74/552 |
| 4,010,658 | 3/1977 | Muller et al. | 74/552 |
| 4,010,659 | 3/1977 | Muller et al. | 74/552 |
| 4,011,643 | 3/1977 | Muller et al. | 74/552 |
| 4,011,644 | 3/1977 | Muller et al. | 74/552 |
| 4,011,645 | 3/1977 | Muller | 74/552 |
| 4,011,772 | 3/1977 | Muller et al. | 74/552 |
| 4,011,773 | 3/1977 | Muller et al. | 74/552 |

FOREIGN PATENT DOCUMENTS

| | | | |
|---|---|---|---|
| 590360 | 3/1925 | France | 74/552 |
| 860980 | 1/1941 | France | 74/552 |
| 1305759 | 8/1962 | France | 74/552 |

*Primary Examiner*—Leslie Braun
*Attorney, Agent, or Firm*—Steven L. Permut; Clifford L. Sadler

[57] ABSTRACT

A flexible steering wheel rim having an upper portion with a pair of arcuate leaf springs. Each leaf spring is mounted to a seat in the lower portion of the rim. The seat is interposed between the two leaf springs such that a gap is formed between the leaf springs which narrows as the leaf springs converge towards each other away from the seat.

8 Claims, 4 Drawing Figures

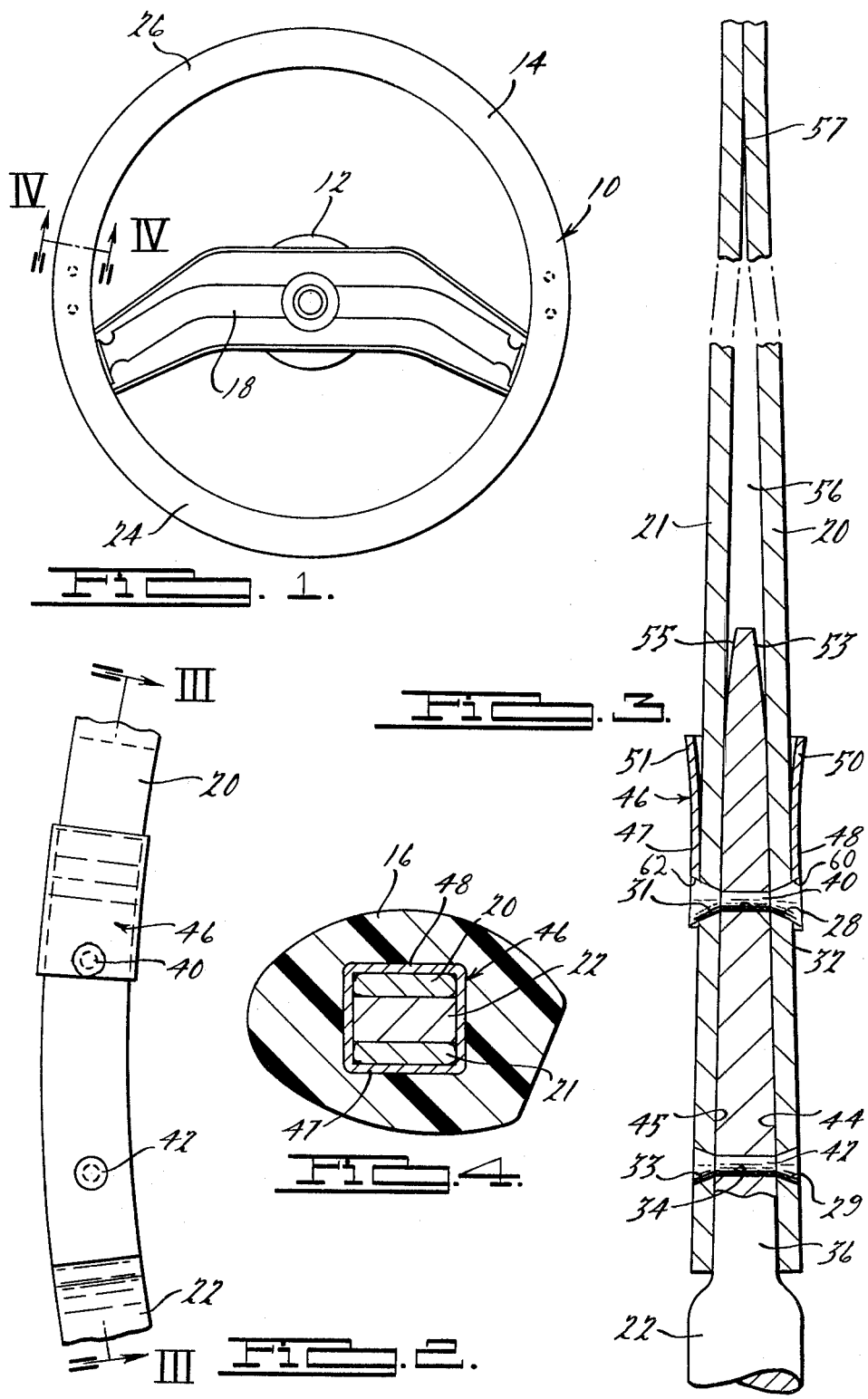

STEERING WHEEL WITH SPLAYED LEAVES

This is a continuation of application Ser. No. 959,980, filed Nov. 13, 1978, now abandoned.

BACKGROUND OF THE INVENTION

1. Field of the Invention

This invention relates generally to steering wheels for motor vehicles and more particularly to a steering wheel construction which contains a flexible leaf spring cord that is resiliently deflectable to absorb impact loads.

2. Description of the Prior Art

Steering wheels have been disclosed that have resilient rims that are deflectable under an impact load. Deflection of the rim causes a portion of the load to be absorbed. Such energy absorbing flexible rims are disclosed in U.S. Pat. Nos. 4,010,658 and 4,010,659 issued to Muller on Mar. 8, 1977; U.S. Pat. Nos. 4,011,643; 4,010,644 and 4,011,773 issued to Muller et al on Mar. 15, 1977; and U.S. Pat. Nos. 4,011,645 and 4,011,772 issued to Muller on Mar. 15, 1977. The above identified patents disclosed a rim with a flexible leaf spring core.

SUMMARY OF THE DISCLOSURE

According to the invention, a steering wheel has a hub, a rim with a lower portion and upper portion covered with an outer covering, and a spoke assembly interconnecting the hub with the lower portion of the rim. The upper portion of the rim has a core including the plurality of leaf springs each of which is arcuate in shape in the plan view of the rim. The leaf springs are mounted to the lower portion of the rim such that at each end of the arcuate leaf spring a seat means is interposed between the plurality of leaf springs.

In one embodiment, a seat portion is located at each upper end of the lower portion of the rim. Each seat portion has opposing surfaces. The ends of each seat surface is tapered toward the other seat surface with each opposing seat surface abutting the leaf spring. Fasteners fasten said leaf springs to the said seat portions.

The leaf springs preferably converge at a point spaced away from the end of the said seat portions forming two narrowing gaps between said leaf springs as the leaf springs converge.

Each leaf spring is preferably fastened to the seat portions by rivets extending through aligned apertures and the leaf springs and the seat portions and the tubular clamps surrounding the leaf springs and seat portions.

The seating arrangement of the leaf springs around the seat portions provides for a long lasting flexible steering wheel which can repeatedly undergo axial flexing.

BRIEF DESCRIPTION OF THE DRAWINGS

Reference now will be made to the following drawings in which:

FIG. 1 is a forward directed plan view of a steering wheel incorporating a preferred embodiment of the invention FIG. 2 is an enlarged fragmentary and sectional view showing the seat where the upper leaf springs are connected to the lower portion of the rim.

FIG. 3 is a side elevational partially segmented view along line III—III in FIG. 2.

FIG. 4 is a cross-sectional view taken along the lines IV—IV of FIG. 1.

DETAILED DESCRIPTION OF THE PREFERRED EMBODIMENT

Referring now to the drawings wherein the preferred embodiment of the invention is illustrated, FIG. 1 discloses a steering wheel 10 having a central hub 12, a rim 14, spokes 18 connecting the hub to the rim, and flexible outer covering 16 covering the spokes 18 and rim 14.

As shown in FIGS. 2, 3, and 4, inside the outer covering 16 is a pair of arcuate leaf springs 20 and 21 forming an upper portion 26 of the rim 14. A substantially rigid wire 22 forms a lower portion 24 of the rim 14. The spokes 18 are connected to the substantially rigid wire 22. The leaf springs 20 and 21 are arcuate in shape and each end connected to each upper end respectively of the rigid wire 22 forming two seat portions. Since both seat portions are structurally the same, only the left hand one, seat portion 36, is disclosed and discussed in detail.

Referring now to FIG. 3, rigid wire 22 has at its left upper end a seat portion 36. The seat portion 36 has two smooth surfaces 44 and 45 which are recessed from the rest of the rigid wire 22. The surfaces 44 and 45 lie in a plane substantially perpendicular to the axis of rotation of the steering wheel 10.

Each leaf spring 20 and 21 is rectangular in cross section and also lies in a plane substantially perpendicular to the axis of rotation of the steering wheel 10. The leaf spring 20 has tapered apertures 28 and 29 aligned with apertures 32 and 34 through the seat portion 36 of the wire 22. The leaf spring 21 has tapered apertures 31 and 33 aligned therewith. A countersunk rivet 40 extends through aligned apertures 28, 32 and 31 and countersunk rivet 42 extends through aligned apertures 29, 33 and 34 to tightly fasten the leaf springs 20 and 21 to the seat portion 36.

As shown in FIGS. 3 and 4, a tubular clamp 46 tightly circumscribes the leaf spring 20, 21 and seat portion 36 of wire 22. The clamp 46 has a rear wall 48 which is flared at its upper end 50 and a front wall 47 also flared forwardly at its upper end 51. Walls 48 and 47 extend over countersunk rivet 40. In addition, seat portion 36 has its surfaces 44 and 45 tapered at their upper extremities 53 and 55, respectively. Clasp 46 has aligned apertures 60 and 62 through which rivet 40 extends.

As shown in FIG. 3, the leaf springs 20 and 21 converge at a point 57 above the upper ends 53 and 55 forming a narrowing gap 56 between the leaf springs 20 and 21.

OPERATION

In operation, the upper portion 26 covered by the flexible plastic outer covering 16 is deformable upon an impact directed parallel to the axis of the steering wheel. Upon a forwardly directed impact on the upper portion 26 of the rim 14, the leaf spring 20 flexes along the tapered end 53 of surface 44 and leaf spring 21 flexes along the flared upper end 51 of wall 47 in a forward direction. When the forward force is terminated, the flexed leaf springs 20 and 21 resiliently spring back to their initial position.

If a rearward directed force is exerted upon the leaf spring 20 and 21, leaf spring 20 flexes rearward to abut the flared upper end 50 of wall 48 and leaf spring 21 flexes against upper end 55 of surface 45. When the rearward force is terminated the leaf springs flex back to their initial position.

The flexure of the leaf spring creates stress therein particularly where it abuts the seat portion. By having the tapered seat portions, flared clamps, and a long narrowing gap 56 between the converging leaf springs 20 and 21, the stress exerted when the leaf springs are flexed are distributed along each leaf spring to reduce any harmful stresses. In this fashion, the steering wheel can be made which can repeatedly undergo resilient flexing in the axial direction yet be rigid under normal steering operations.

Variations and modifications are possible within the scope of the foregoing disclosure and drawings without departing from the spirit of the invention which is defined by the appended claims.

I claim:

1. A steering wheel for a motor vehicle comprising:
   a hub;
   a rim having a lower portion and upper portion;
   a spoke assembly interconnecting the hub with the lower portion of the rim;
   said lower and upper portions being covered with a flexible outer covering;
   said upper portion of said rim including a plurality of stacked arcuate leaf springs;
   seat means mounting said leaf springs such that the leaf springs are splayed about the seat means and said seat means is interposed between the leaf springs;
   said seat means comprising:
   said lower portion of the rim having a seat portion at each upper end thereof with opposing surfaces;
   the ends of each seat portion being tapered by said opposing surfaces angling toward each other;
   each opposing surface abutting a leaf spring;
   fastener means for fastening said leaf springs to said seat portion;
   said upper portion being deformable in response to an impact imposed thereon in a direction parallel to the axis of said steering wheel;
   said upper portion being constructed to be substantially rigid with respect to a tangential force applied by a vehicle operator to said upper portion for the purpose of turning said steering wheel;
   said leaf springs seated on each seat portion converging at a point spaced away from the end of said seat portions forming a narrowing gap between said leaf springs above said seat portions.

2. A steering wheel as defined in claim 1 wherein the fastener means comprise;
   fasteners extending through aligned apertures in the leaf springs and seat portions and fastening the leaf springs to said seat portions;
   a tubular clamp tightly surrounding each seat portion and abutting the leaf springs above the fasteners.

3. A steering wheel as defined in claim 2 wherein;
   the tubular clamp has a widened flared upper end which flares away from the leaf springs and said clamp extends over a fastener through each seat portion.

4. A steering wheel for a motor vehicle comprising;
   a hub;
   a rim including a first arcuate portion and a second arcuate portion overlapping said first arcuate portion at both ends thereof;
   a spoke assembly interconnecting the hub with said rim;
   said second portion of said rim including a plurality of stacked arcuate leaf springs;
   seat means mounting both ends of said leaf springs onto said first portion of said rim such that the leaf springs diverge and the seat means is interposed between the leaf springs;
   said second portion being deformable in response to an impact imposed thereon in a direction parallel to the axis of said steering wheel;
   said second portion constructed to be substantially rigid with respect to a tangential force applied by a vehicle operator to said second portion for the purpose of turning said steering wheel;
   the leaf springs seated on said seat means converge at a point spaced away from the end of said means forming a narrowing gap between said leaf springs extending beyond said end of said seat means.

5. A steering wheel as defined in claim 4 wherein the fasteners means comprise;
   fasteners extending through aligned apertures in the leaf springs and seat means and fastening the leaf springs to said seat means;
   a tubular clamp tightly surrounding each seat means and abutting the leaf springs toward the end of said seat means from the fasteners.

6. A steering wheel as defined in claim 5 wherein the tubular clamp has a widened face end toward the end of the seat means, which flares away from the leaf springs.

7. A steering wheel as defined in claim 6 wherein said clamp extends over a fastener through each seat means.

8. A steering wheel for a motor vehicle comprising;
   a hub;
   a rim including a first arcuate portion with a pair of spaced apart ends and a second arcuate portion with a pair of spaced apart ends;
   said ends of said first arcuate portion being connected to said ends of said second portion whereby an annular assembly is formed;
   a spoke assembly interconnecting the hub with said rim;
   said second portion of said rim including at least wo arcuate leaf springs;
   one end of said first arcuate portion having a pair of spring seats arranged in inclined relationship to each other;
   said leaf springs having diverging ends;
   said one end of said first portion being interposed between said diverging ends of said two leaf springs and having said spring seats secured to said diverging ends;
   said second portion being deformable in response to an impact imposed thereon in a direction parallel to the axis of said steering wheel;
   said second portion constructed to be substantially rigid with respect to a tangential force applied by a vehicle operator to said second portion for the purpose of turning said steering wheel.

* * * * *